(12) United States Patent
Harris

(10) Patent No.: US 6,824,076 B2
(45) Date of Patent: Nov. 30, 2004

(54) PNEUMATIC CONTROL SYSTEM FOR A WATER CANNON

(75) Inventor: Lloyd E. Harris, Canyon Country, CA (US)

(73) Assignee: Technifex, Inc., Valencia, CA (US)

(*) Notice: Subject to any disclaimer, the term of this patent is extended or adjusted under 35 U.S.C. 154(b) by 225 days.

(21) Appl. No.: 09/683,891

(22) Filed: Feb. 27, 2002

(65) Prior Publication Data

US 2003/0160112 A1 Aug. 28, 2003

(51) Int. Cl.[7] .............................. A62C 5/00; A62C 2/00; A01G 27/00; B05B 1/30
(52) U.S. Cl. .......................... 239/311; 239/67; 239/68; 239/69; 239/569; 239/574; 169/46; 169/47; 169/62; 169/63; 169/64; 169/65; 169/66
(58) Field of Search .................... 239/311, 67, 68, 239/69, 71, 99, 63, 61, 66, 101, 270, 569, 574; 169/46, 47, 62–66

(56) References Cited

U.S. PATENT DOCUMENTS

| | | | |
|---|---|---|---|
| 3,722,819 A | 3/1973 | Hall et al. | 239/102 |
| 4,852,801 A | 8/1989 | Fuller et al. | 239/12 |
| 4,905,900 A | 3/1990 | Scharton et al. | 239/99 |
| 5,158,208 A | * 10/1992 | Wilson | 222/78 |
| 5,425,504 A | 6/1995 | Patterson | 239/11 |
| 5,463,926 A | * 11/1995 | Faughn | 89/1.2 |
| 5,934,558 A | 8/1999 | Samayoa et al. | 239/20 |
| 6,119,955 A | 9/2000 | Starr | 239/11 |

* cited by examiner

*Primary Examiner*—Davis Hwu
(74) *Attorney, Agent, or Firm*—Holland & Hart LLP; Christopher J. Kulish, Esq.

(57) ABSTRACT

A method and apparatus are provided for pneumatically controlling the operation of a water cannon such that the need for electrically power in the immediate vicinity of the water cannon is substantially avoided.

5 Claims, 6 Drawing Sheets

PNEUMATIC CONTROL SYSTEM FOR A WATER CANNON

FIELD OF THE INVENTION

The present invention relates to water cannons and, in particular, to a pneumatic control system for a water cannon.

BACKGROUND OF THE INVENTION

The typical water cannon comprises a barrel assembly that has an opening or nozzle through which a body of water is driven by the application of a mechanical force. There are at least two types of barrel assemblies employed in water cannons. The first type includes a piston that is located within a barrel and used to apply a mechanical to a body of water located in the barrel. To elaborate, the operation of the piston involves: (a) positioning the piston at a location within the barrel that will allow the piston to be displaced such that water is forced through the opening; and (b) displacing the piston such that a mechanical force is applied to a body of water located between the piston and the opening so that the water is driven through the opening. An example of such a barrel assembly is illustrated in U.S. Pat. No. 6,119,955, which is incorporated herein by reference.

The second type of barrel assembly utilizes a barrel with a nozzle through which a body of water is driven (i.e., the opening) and a second end that is in communication with a channel that extends towards the nozzle. Typically, the barrel, channel and communication path between the second end of the barrel and the channel have a U-shape. An example of such a barrel assembly is illustrated in U.S. Pat. No. 3,722,819, which is incorporated herein by reference. In operation, the channel is used to carry a pressurized gas (typically, air) that is used to drive a body of water held in the barrel out of the nozzle.

The typical water cannon also comprises a control system that interfaces with the barrel assembly and operates: (a) to place the barrel assembly in a condition or state so a mechanical force can be applied to a body of water in the barrel of the cannon; and (b) to cause a mechanical force to be applied to the body of water that forces the body of water out of the opening of the barrel assembly. In many such control systems, electrical components are employed that are in the immediate vicinity of the water cannon and, as such, are subject to coming into contact with water. Such systems must typically employ a number of measures to prevent the electrical components of the control system from coming into contact with water and either becoming disabled or presenting a safety hazard to individuals in the vicinity of the water cannon.

SUMMARY OF THE INVENTION

The present invention is directed to a pneumatic control system for a water cannon that substantially avoids the need for electrical circuitry in the immediate vicinity of the cannon.

Generally, the pneumatic control system is applicable to water cannons whose operation involves at least two steps, the first step being the priming of the cannon, which at least includes the loading of a body of water into the barrel of the cannon, and the second step involving the "firing" of the cannon such that the body of water is expelled from the barrel. One example of this type of water cannon is a cannon that employs a barrel assembly with a piston that is used to push a body of water out of the barrel of the cannon. With a piston-type of water cannon, the first step involves not only the loading of a body of water into the barrel of the cannon but also the positioning of the piston so that the piston can subsequently push the body of the water out of the cannon. The second step, with a piston-type of water cannon, involves moving the piston such that the body is pushed out of the barrel. Typically, the second step occurs in response to the actuation of a trigger. Another example of a water cannon whose operation involves at least two steps is the piston-less water cannon, an embodiment of which is shown in U.S. Pat. No. 3,722,819.

In one embodiment, the pneumatic control system comprises a valve that interfaces with the barrel assembly and is used to apply a fluid-related force to a body of water in the barrel in response to a pneumatic "fire" signal. In the case of a pistonless water cannon, the fluid-related force is applied directly to the body of water and the fluid-related force is typically in the form of a gas (e.g., air). For a piston-type water cannon, the fluid-related force is indirectly applied to the body of water. Namely, the fluid-related force is applied to the piston and then the piston transmits the force to the body of water. In this case, the fluid-related force can take either the form of a gas (e.g., air) or a liquid (e.g., water).

The control system further comprises a pneumatic trigger for producing the pneumatic "fire" signal that is applied to the valve. The pneumatic trigger is subject to a pneumatic enable/disable signal. To elaborate, when the pneumatic enable/disable signal is in the disable state, actuation of the pneumatic trigger does not cause the pneumatic "fire" signal to be produced. If, however, the enable/disable signal is in the enable state, actuation of the pneumatic trigger results in the production of the "fire" signal.

The pneumatic control system further includes pneumatic logic that operates to: (a) produce a disable/enable signal in the disable state so that the pneumatic trigger cannot be fired by actuation of the pneumatic trigger when the cannon is being fired or when the cannon is being primed; (b) produce a disable/enable signal in the enable state so that the pneumatic trigger can be fired when the cannon is not already in the act of being fired and the cannon is primed to fire; and (c) cause the valve to transition from the "primed" state to the "fire" state in response to a "fire" signal from the pneumatic trigger.

In one embodiment, the pneumatic logic includes at least three pneumatic devices that each have at least one input for receiving a pneumatic signal (i.e., a gas signal) and at least one output for providing a pneumatic signal. The first pneumatic device receives a pneumatic signal from a third pneumatic device that is indicative of the state of the water cannon, i.e., the cannon is either in the act of firing or in the act of being primed. The first pneumatic device provides a first "prime" signal a predetermined amount of time after receiving the signal from the third pneumatic device that indicates that the water cannon is in the act of firing. The predetermined amount of time being an amount of time for the cannon to sufficiently complete a firing. As a consequence, the first "prime" signal is an indication that priming of the water cannon can commence.

The second pneumatic device receives a second "prime" signal that is produced by the third pneumatic device in response to the first "prime" signal. The second pneumatic device provides a pneumatic signal that is used to enable or disable the pneumatic trigger. The second pneumatic device operates so as to provide the pneumatic signal that shifts the trigger from a disabled state to an enabled state a predetermined amount of time after the second "prime" signal is received. Consequently, the second pneumatic device operates to produce a pneumatic signal that disables the trigger during priming of the water cannon and enables the trigger after priming of the water cannon is sufficiently complete.

The third pneumatic device receives a stream of gas that is distributed throughout the pneumatic logic and provides the basis for each of the pneumatic signals produced by the pneumatic logic. Further, the third pneumatic device receives the first "prime" signal provided by the first pneumatic device and the "fire" signal provided by the pneumatic trigger. Operation of the third pneumatic device is according to exclusive-or logic, i.e., the device is only capable of responding to one of the first "prime" signal and the "fire" signal at any point in time. Stated differently, the third pneumatic device is not capable of responding to the first "prime" signal and the "fire" signal at the same time. In operation, the third pneumatic device responds to the first "prime" signal produced by the first pneumatic device by providing the second "prime" signal to the second pneumatic device. The third pneumatic device responds to the "fire" signal produced by the pneumatic trigger by providing a pneumatic signal that causes the valve to release a pressurized gas or liquid into the barrel of the cannon and thereby "fire" the cannon. This pneumatic signal is also provided to the first pneumatic device to indicate that the state of the water canon, namely, that the cannon is in the act of firing.

In one embodiment, the first pneumatic device comprises a pneumatic timer that operates to produce the first "prime" signal at a predetermined amount of time after receiving a pneumatic signal indicating that the water cannon is in the act of firing. The predetermined amount of time being an amount of time for the water cannon to sufficiently complete a firing.

In another embodiment, the first pneumatic device comprises a pneumatic sensor/gate assembly that operates to produce the first "prime" signal after a sufficiently complete firing of the water cannon is detected by sensing that the water in the barrel of the cannon is at or below a predetermined level. In the case of a piston-type cannon, a sufficiently complete firing is detected by either sensing that the water is at or below a predetermined level or that the piston has traveled to a predetermined location in the barrel. In any event, the pneumatic sensor/gate assembly operates such that the pneumatic signal that indicates that the water cannon is in the act of firing "sets" the gate, i.e., causes the first "prime" signal to become inactive. A pneumatic signal produced by the sensor indicating that a sufficiently complete firing has occurred is applied to the gate and causes the gate to "reset", i.e., causes the first "prime" signal to become active.

In yet a further embodiment, the second pneumatic device comprises a pneumatic timer that operates to produce the pneumatic signal that enables the trigger at a predetermined amount of time after receiving the second "prime" signal. In this case, the predetermined amount of time is an amount of time that is sufficient for the water cannon to have been primed.

In another embodiment, the second pneumatic device comprises a pneumatic sensor/gate assembly that operates to produce the pneumatic signal that enables the trigger after a sufficiently complete priming of the water cannon is detected by sensing that the water in the barrel of the cannon is at or above a predetermined level. In the case of a piston-type cannon, a sufficiently complete priming is detected by sensing either that water in the barrel is at or above a predetermined level or that the piston is at a predetermined location in the barrel, i.e., a location from which the piston can be moved to cause a body of water to be ejected from the cannon. In any event, the pneumatic sensor/gate assembly operates such that the second "prime" signal "sets" the gate, i.e., causes the pneumatic signal that disables the trigger to issue. The receipt by the gate of a pneumatic signal from the sensor indicating that a sufficiently complete priming has occurred "resets" the gate, i.e., causes the pneumatic signal that enable the trigger to issue.

Another embodiment of the pneumatic control system is applicable to water cannons in which a body of water is loaded before firing but that already have a pneumatic trigger and valve. In this case, the pneumatic control system comprises the pneumatic logic without the valve and pneumatic trigger, and the pneumatic logic is retrofitted to the cannon.

DETAILED DESCRIPTION

The present invention is directed to a pneumatic control system for a water cannon whose operation involves the loading of a body of water into the barrel of the cannon and the subsequent application of a force to the body of water that drives the body of water out of the barrel.

Before describing the pneumatic control system, two types of water cannons to which the pneumatic control system is applicable are described. The first type is a piston-type water cannon and the second type is a pistonless-type water cannon. Characteristic of both types of cannons is that a body of water is loaded into the barrel of the cannon and a force is then applied to the body of water that drives the body of water out of the cannon.

Figure 1:
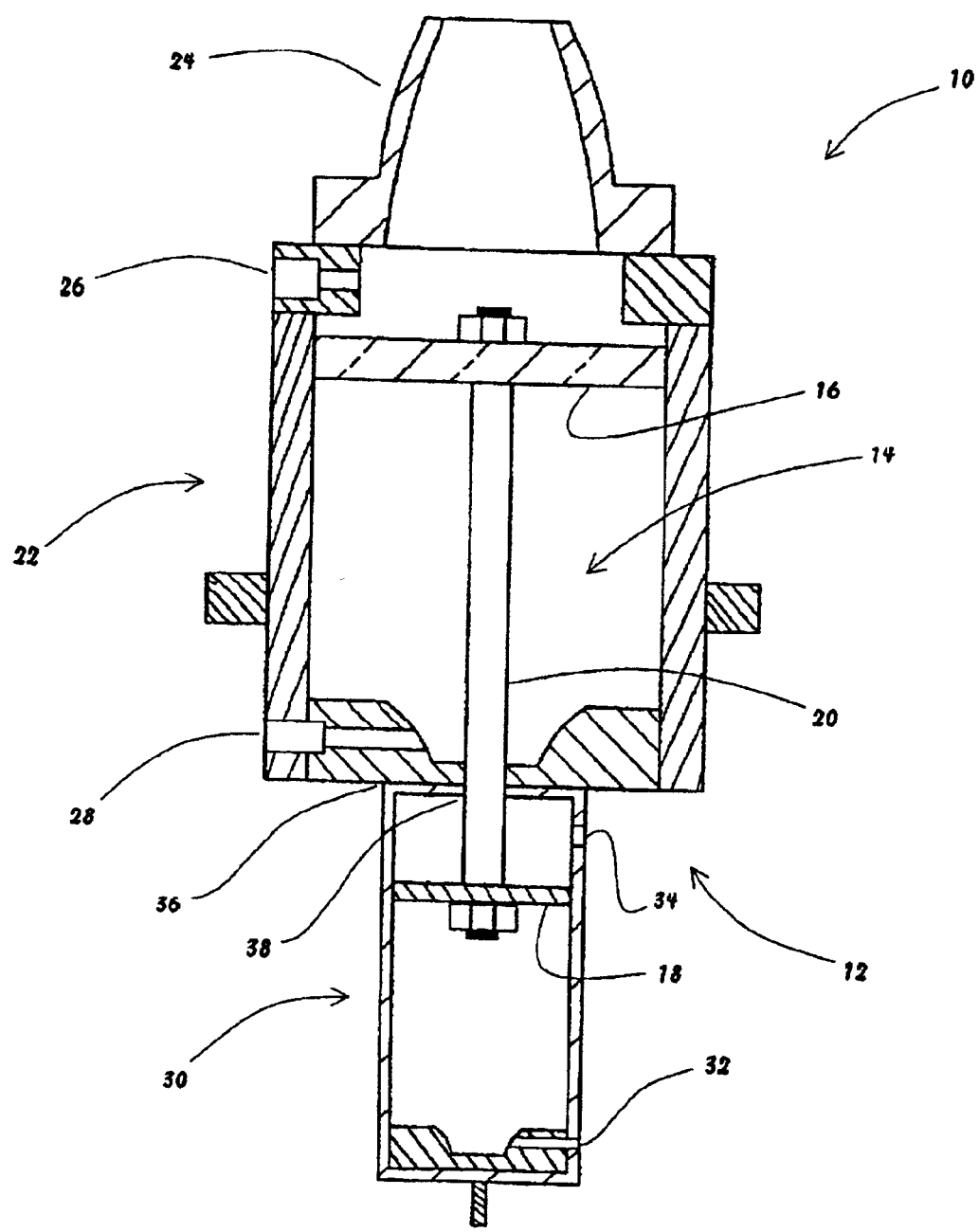
FIG. 1 is a cross-section of a barrel assembly for a typical piston-type water cannon.

FIG. 1 is a cross-sectional view of a barrel assembly 10 of a typical piston-type water cannon. Generally, the barrel assembly 10 includes a barrel 12 and a piston 14 that resides within the barrel 12. The piston 14 comprises a first disk 16, a second disk 18, and a rod 20 that connects the first disk 16 and the second disk 18. The barrel 12 includes a first chamber 22 that holds the first disk 16. In addition, the first chamber 22 includes a nozzle 24, a water inlet port 26 for loading water into the first chamber 22, and a first air port 28 that allows air to move in and out of the first chamber 22 during movement of the piston 14 and thereby facilitate movement of the piston 14. To elaborate, the first air port 28 allows air to enter the first chamber 22 during firing of the water cannon (i.e., during movement of the piston 14 towards the nozzle 24) to prevent a vacuum from forming between the first disk 16 and the bottom of the first chamber 22 that would impede the movement of the piston 14. Similarly, the first air port 28 allows air to exit the first chamber 22 during retraction of the piston 16. The barrel 12 also includes a second chamber 30 that holds the second disk 18 of the piston 14. In addition, the second chamber 30 includes a second air port 32 for transmitting air into the second chamber 30 to facilitate movement of the piston 14 towards the nozzle 24 and transmitting air out of the second chamber 30 when the piston 14 is being moved away from the nozzle 24. A third air port 34 is provided for use in transmitting air that is used to move the piston 14 away from the nozzle 24 and thereby position the piston 14 for subsequently moving towards the nozzle 24 to eject water in the first chamber 22 from the nozzle 24. A wall 36 separates the first chamber 22 and the second chamber 30 from one another. A hole 38 in the wall 34 accommodates the rod 20 of the piston 14.

Operation of the barrel assembly 10 comprises priming the barrel assembly 10 by injecting water into the first chamber 22 via the water inlet port 26 and moving the piston 14 away from the nozzle 24 by injecting a gas into the second chamber 30 via the third air port 34. In addition, air is allowed to escape from the first chamber 22 via the first air port 28. Likewise, gas is allowed to escape from the second chamber 30 via the second air port 32. The "firing" of the barrel assembly 10 (i.e., the ejection of a body of water located in the first chamber 22 through the nozzle 24) is accomplished by injecting pressurized air into the second chamber 30 via the second air port 32 to cause the piston 14 to move towards the nozzle 24 and thereby eject the body of water previously established in the first chamber 22. Movement of the piston 14 is facilitated by allowing air to enter the first chamber 22 via the first air port 28 and air to escape from the second chamber 30 via the third air port 34.

Figure 2:
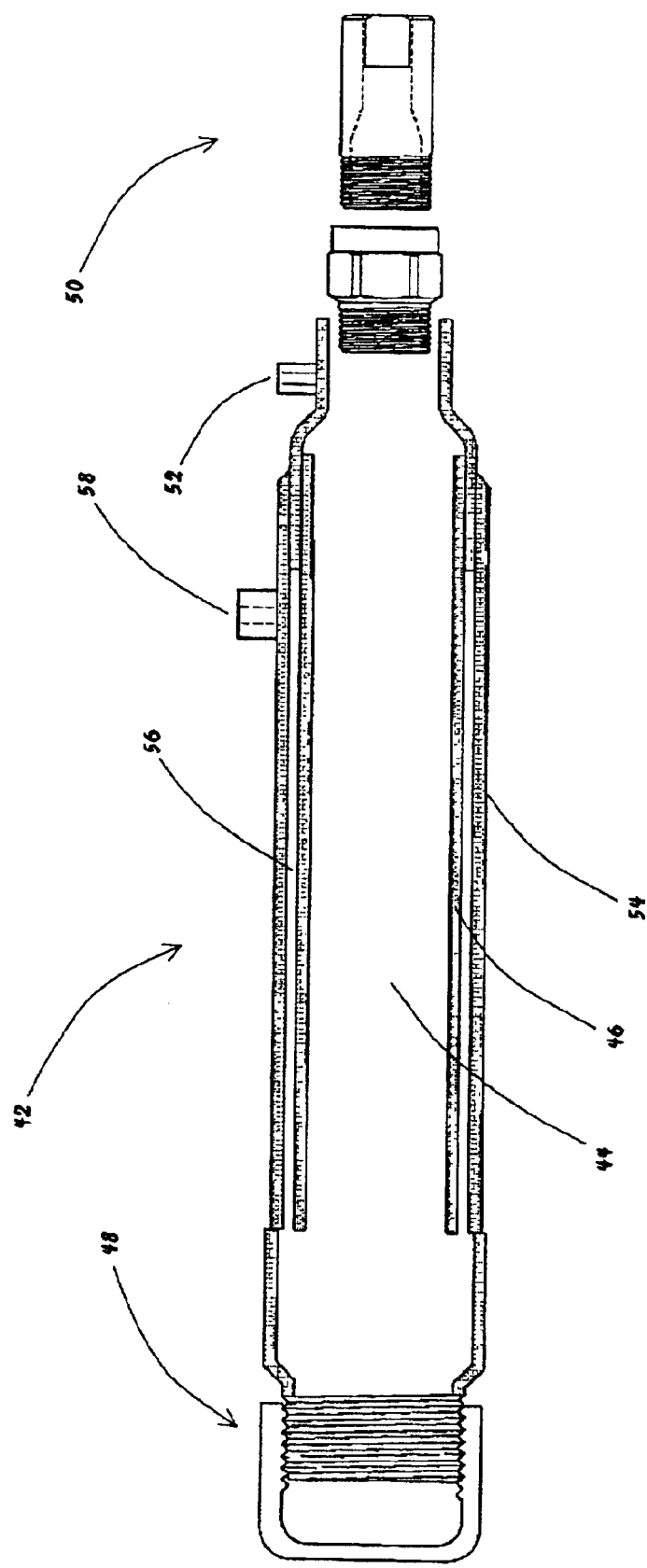
FIG. 2 is a cross-section of a barrel assembly for a typical pistonless-type water cannon.

FIG. 2 is a cross-sectional view of a barrel assembly 42 of a typical pistonless-type water cannon. Generally, the assembly 42 includes a chamber 44 for holding a body of water. The chamber 44 is substantially defined by an inner sleeve 46 and includes a closed end 48 and a nozzle 50. A water inlet port 52 is utilized to load a body of water into the chamber 44. An outer sleeve 54 is separated from the inner sleeve 46 and in conjunction with the inner sleeve 46 defines a gas channel 56. A gas inlet port 58 is used to transmit a gas to the gas channel 56.

Operation of the barrel assembly 42 comprises priming the barrel assembly 42 by injecting water into the chamber 44 via the water inlet port 52. Once a sufficient body of water has been loaded into the chamber 44, a gas (e.g., air) is injected into the gas channel 56 via the gas inlet port 58. The gas travels down the gas channel and, in so doing, drives the body of water in the chamber 44 out the nozzle 50.

Figure 3:
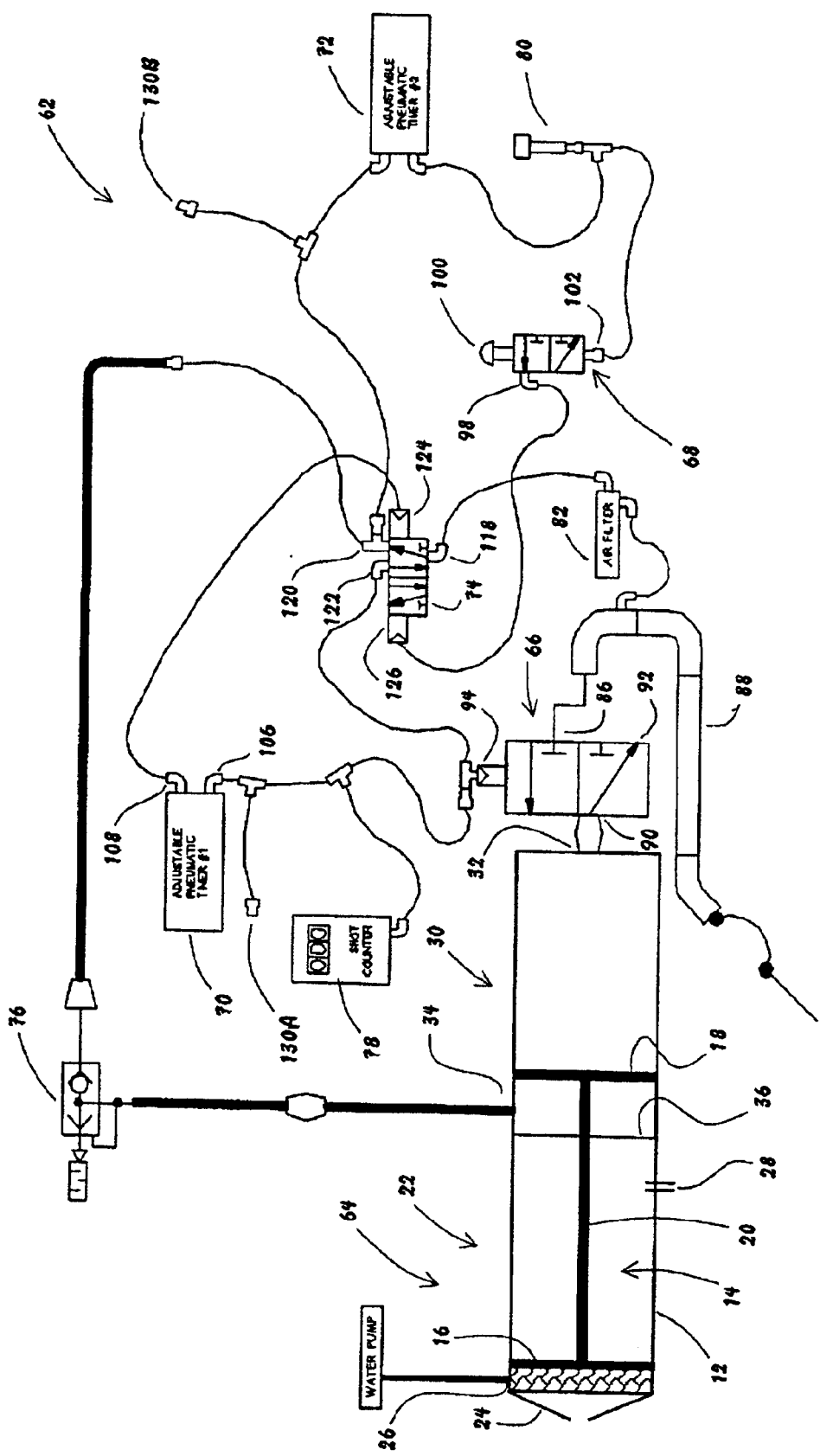
FIG. 3 is a schematic of a pneumatic control system for a typical piston-type water cannon.

With reference to FIG. 3, an embodiment of a pneumatic control system 62 that is applicable to a piston-type water cannon of the type illustrated in FIG. 2 is described. A barrel assembly 64 for the piston-type water cannon is illustrated with elements that correspond to the elements of barrel assembly 10 given the same reference numbers.

The control system 62 generally comprises: (a) a pneumatic valve 66 for transmitting gas (e.g., air) to and from the second chamber 30 of the barrel 12; (b) a pneumatic trigger 68 for generating a pneumatic "fire" signal to cause the valve 66 to inject air into the second chamber 30 of the barrel 12 to move the piston 14 and thereby eject water from the first chamber 22 via the nozzle 24; (c) a first pneumatic timer 70 for providing a pneumatic signal after a sufficiently completed firing of the barrel assembly 64 that is used in priming the barrel assembly 64 for another firing; (d) a second pneumatic timer 72 for providing a pneumatic signal after the barrel assembly 64 has been sufficiently primed that enables the pneumatic trigger 68; and (e) a pneumatic exclusive-or valve 74 that responds to the pneumatic signal output by the first pneumatic timer 70 by providing a pneumatic signal to the second pneumatic timer 72 that causes the second pneumatic timer 72 to wait a sufficient amount of time for priming activities to be completed before providing a pneumatic signal that enables the pneumatic trigger 68 and by taking action to cause the piston 14 to be positioned for a firing The pneumatic exclusive-or valve 74 also responds to the pneumatic "fire" signal output by the pneumatic trigger by providing a pneumatic signal to the first pneumatic timer 70 that indicates that the barrel assembly 64 is either in the act of being fired or primed. The control system 62 further includes a quick exhaust valve 76 that directs air to the second port 34 to cause the piston 14 to retract during priming of the barrel assembly 64 and directs air from the second chamber 30 to the exterior environment during firing of the barrel assembly 64. The control system 62 further comprises a shot counter 78 that provides a count of the number of firings of the barrel assembly 64, which is useful for maintenance purposes and the like. Also included in the control system 62 is a pressure indicator 80 that provides a user with an indication of when the pneumatic trigger 68 is enabled and, as a consequence, when actuation of the pneumatic trigger 68 will result in the firing of the water cannon. An air filter 82 serves to filter the air that is used by the pneumatic components in the remainder of the control system 62.

The pneumatic valve 66 is a 3-way, air actuated valve that includes an inlet port 86 for receiving air from an air supply line 88, a bi-directional port 90 for providing air to the second chamber 30 during firing of the barrel assembly 64 and receiving air from the second chamber 30 during priming of the barrel assembly 64, and a second outlet port 92 for venting air received by the bi-directional port 90 during priming of the barrel assembly 64 to the exterior environment. A control port 94 is used to place the valve 66 in either a "fire" state or a "primed" state. In the "fire" state, the valve 66 allows air to pass from the inlet port 86 to the bi-directional port 90 and then into the second chamber 30 of the barrel assembly 64 to move the piston 14 and thereby eject a body of water in the first chamber 22 from the nozzle 24. In the "primed" state, the valve 66 allows air from the second chamber 30 of the barrel assembly 64 to pass from the bi-directional port 90 to the output port 92 during priming and, more specifically, during retraction of the piston 14. The control port 94 is responsive to a pneumatic firing/priming signal that is in either a "firing" state or a "priming" state and provided by the pneumatic exclusive-or valve 74. When the firing/priming signal is in the "firing" state, the control port 94 places the valve in the "fire" state. Conversely, when the firing/priming signal is in the "priming" state, the control port 94 places the valve in the "primed" state.

The pneumatic trigger 68 is a 3-way, manually activated valve that includes an outlet port 98 for providing a pneumatic "fire" signal, a trigger 100, and a control port 102 that is used to place the trigger 68 in either a "disabled" state or an "enabled" state. In the "disabled" state, actuation of the trigger 100 has no effect, i.e., there is no "fire" signal produced at the outlet port 98. In effect, the trigger 68 is in a "safetyon" condition in the "enabled" state, which is effectively a "safety-off" condition, actuation of the trigger 100 results in a "fire" signal being produced at the outlet port 98. The control port 102 is responsive to a pneumatic disable/enable signal that is either in a "disable" state or an "enable" state and provided by the second pneumatic timer 72. When the disable/enable signal is in the "disable" state, the control port 102 places the trigger 68 in the "disabled" state. Conversely, when the disable/enable signal is in the "enable" state, the control port 102 places the trigger 68 in the "enabled" state.

The first pneumatic timer 70 includes an inlet port 106 for receiving a pneumatic firing/priming signal from the exclusive-or valve 74 and an outlet port for providing a pneumatic, first "prime" signal. When the timer 70 receives a firing/priming signal that is in a "firing" state (i.e., indicative of the barrel assembly 64 being fired), the timer 70 responds by providing the first "prime" signal at a predetermined amount of time after receiving the firing/priming signal in the "firing" state. The predetermined amount of time is at least the time required for a firing of the barrel assembly 64 to be sufficiently completed. Consequently, the first "prime" signal indicates that a firing of the barrel assembly 64 is at a point that priming operations can commence for a subsequent firing. When the timer 70 receives a firing/priming signal that is in the "priming" state (i.e., indicative of the barrel assembly 64 being primed for a firing), the first "prime" signal becomes inactive.

The second pneumatic timer 72 includes an inlet port 112 for receiving a second "prime" signal from the exclusive-or valve 74 and an outlet port 114 for providing the pneumatic, disable/enable signal to the trigger 68. When the timer 72 receives the second "prime" signal (i.e., indicative of the barrel assembly 64 being primed for another firing), the timer 72 responds by providing the disable/enable signal in the enabled state at a predetermined amount of time after receiving the second "prime" signal. The predetermined amount of time is at least the time required for a the barrel assembly 64 to be primed, i.e., the barrel 12 loaded with a body of water and the piston 14 positioned to apply a mechanical force to the body of water. Consequently, the providing of the disable/enable signal in the enable state indicates that the priming of the barrel assembly 64 is sufficiently complete. As a consequence, the pneumatic trigger 68 can be actuated and the barrel assembly fired. When the second "prime" signal is inactive (i.e., indicative of the barrel assembly 64 being fired), the timer 72 provides the disable/enable signal in the disable state, which renders any actuation of the pneumatic trigger 68 ineffective.

The pneumatic exclusive-or valve 74 includes a gas port 118 for receiving air from the air supply line 88 that has been processed by the air filter 82. The air received at the gas port 118 is distributed throughout the control system 62 and used by the components of the control system 62 to generate pneumatic signals. In addition, the air received at the gas port 118 is used to retract the piston 14 during priming of the barrel assembly 64. The valve 74 further includes a first outlet port 120 for providing the second "prime" signal to the second pneumatic timer 72 and providing gas to the second port 34 to retract the piston 14 during priming of the barrel assembly 64. A second outlet port 122 is used to provide the firing/priming signal. A first control port 124 receives the first "prime" signal provided by the first pneumatic timer 70. Similarly, a second control port 126 receives the "fire" signal produced by the pneumatic trigger 68. When the first "prime" signal is received at the first control port 124, the valve 74 responds by providing the second "prime" signal to the second pneumatic timer 72. In addition, the valve 74 provides gas to the second port of the barrel assembly 64 to facilitate the retraction of the piston 14. The valve 74 further responds to the first "prime" signal by providing a firing/priming signal in the "priming" state at the second outlet port 122. In contrast, when the "fire" signal is received at the second control port 126, the valve responds by providing the firing/priming signal in the "firing" state at the second outlet port 122. Further, the valve 74 causes the second "prime" signal at the first port 120 to go inactive, which is indicative of the barrel assembly 64 being fired. Additionally, the valve 74 terminates the provision of any air to the barrel 12 via the second port 34 that would inhibit the firing action of the piston 14.

The shot counter 78 is incremented every time the barrel assembly is fired. In the illustrated embodiment, the counter 78 is incremented every other transition between the "firing" and "priming" states of the firing/priming signal.

The pressure indicator 80 indicator provides a visual indication to an operator that the disable/enable signal provided by the second pneumatic timer 72 is in the "enable" state, meaning that the operator can actuate the trigger 100 to effect the firing of the barrel assembly 64.

A pair of lubrication ports 130A, 130B allow lubricants to be injected into the control system 62 during servicing that extend the life of elastomeric seals and the like that are present in many of the components of the system.

Generally, operation of a pneumatic control system 62 for the piston-type water cannon involves the steps of: (a) priming the water cannon, (i.e., loading a body of water into the barrel 12, positioning the piston 14 for subsequently applying a force to the body of water; disabling the trigger 68, and placing the valve 66 in the "priming" state); (b) enabling the trigger 68 after the priming step is sufficiently complete; and (c) firing the cannon (i.e., placing the valve 66 in the "firing" state and thereby causing the piston 14 to apply a mechanical force to the body of water in the barrel 12).

Figure 4A:
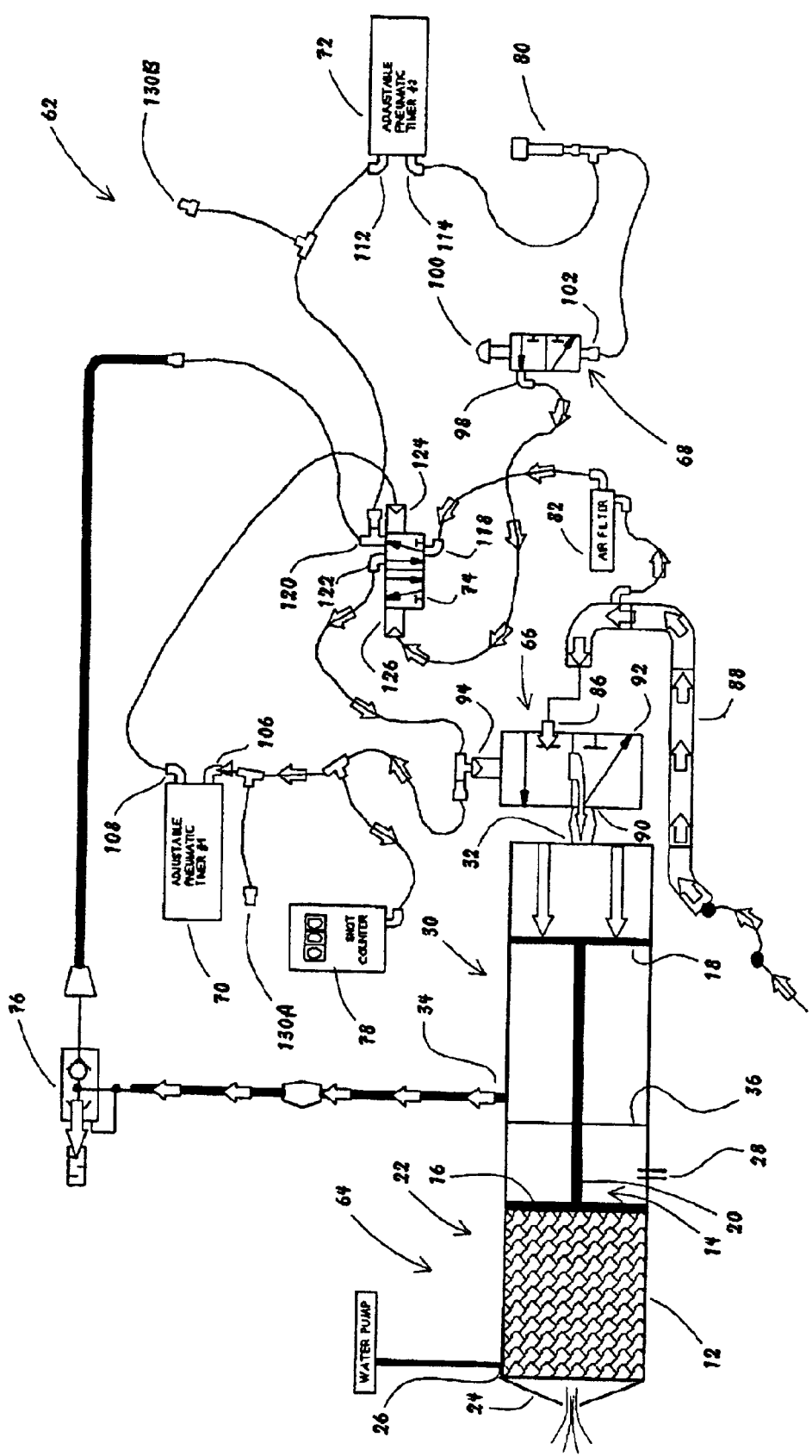
FIGS. 4A–4C respectively illustrate the states of the pneumatic control system while the piston-type water cannon is firing, after the cannon has fired and while priming of the cannon is taking place, and after priming has been complete but before the cannon is fired.

With reference to FIG. 4A, the operation of the pneumatic control system 62 is described beginning with the firing step. The firing step commences with a user actuating the trigger 100 after the pneumatic trigger 68 has received a disable/enable signal in the enable state from the second pneumatic timer 72. Actuation of the trigger 100 causes the pneumatic trigger 68 to provide the pneumatic "fire" signal to the second control port 126 of the exclusive-or valve 74. In addition, actuation of the trigger 100 causes the pressure in the line extending between the second pneumatic timer 72 and the trigger 68 to decrease and thereby place the disable/enable signal in the "disable" state.

The exclusive-or valve 74 responds to the "fire" signal from the trigger 68 by blocking the outlet port 120, which causes pressure in the line between the valve 74 and the second pneumatic timer 72 to decrease and thereby reset or render inactive the second "prime" signal. Further, the valve 74 terminates the provision of air from the outlet port 120 to the third air port 34 associated with the barrel 12. As a consequence, air is not being forced into the second chamber 30 of the barrel 12 that would inhibit the forward movement of the piston 14. In addition, the forward movement of the piston 14 causes air that is in the second chamber and between the second disk 18 and the wall 36 to be forced out of the third air port 34. The air is then directed by operation of the quick exhaust valve 76 to the exterior environment.

The exclusive-or valve 74 also responds to the "fire" signal by providing the firing/priming signal in the "firing" state at the second outlet port 122. The firing/priming signal in the "firing" state is conveyed to the control port 94 of the valve 66, the shot counter 78, and the inlet port 106 of the first pneumatic timer 70. In response to the firing/priming signal in the "firing" state, the control port 94 places the valve in the "firing" state, which allows pressurized air from the air supply line 88 to pass from the inlet port 86 to the outlet port 92 and into the second chamber 30 of the barrel 12. Assuming the barrel assembly 64 has been appropriately primed, the pressurized air then forces the piston 12 towards the nozzle 24 and in so doing forces at least a portion of the body of water in the first chamber 22 of the barrel out of the nozzle 24. The shot counter 78 responds to the transition of the firing/priming signal from the "priming" state to the "firing" state by incrementing its counter. The first pneumatic timer 70 responds to the firing/priming signal in the "firing" state by implementing a "delay" whereby the first "prime" signal will be produced at a outlet port 108 at a predetermined amount of time after the firing/priming signal in the "firing" state is received. The predetermined amount of time being a time that allows for the sufficient completion of the firing step before beginning the priming step.

Figure 4B:
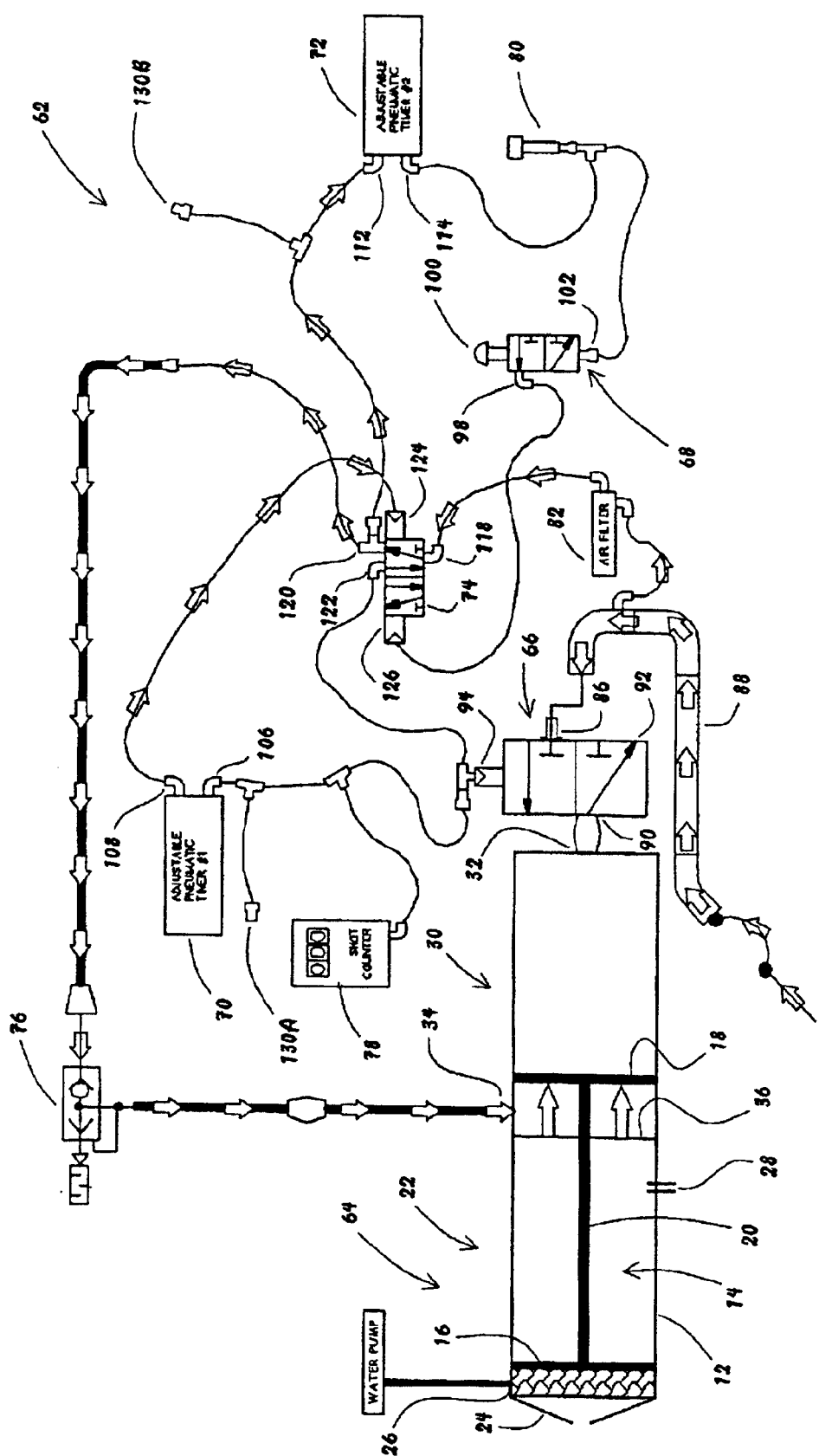

With reference to FIG. 4B, the priming step commences with the first pneumatic timer 70 providing the first "prime" signal at the outlet port 108. The first "prime" signal is applied to the first control port 124 of the exclusive-or valve 74. In response, the exclusive-or valve 74 blocks the outlet port 122, which causes pressure in the line between the valve 74 and the first pneumatic timer 72 to decrease and thereby place the firing/priming signal in the "priming" state.

The valve 74 also responds to the first "prime" signal being applied to the first control port 124 by causing air to be conveyed from the first outlet port 120 to the quick exhaust valve 76. In turn, the quick exhaust valve directs the air to the third air port 34. This air is then used to push the piston 14 away from the nozzle 24 and thereby position the piston 14 for a subsequent firing. The first control port 124 also responds to the first "prime" signal by causing the second "prime" signal to be provided at the first outlet port 120. The second "prime" signal is conveyed to the inlet port 112 of the second pneumatic timer 72. The second pneumatic timer 72 responds to the second "prime" signal by implementing a "delay" such that a disable/enable signal in the "enable" state will be produced at a outlet port 114 at a predetermined amount of time after the second "prime" signal is received. The predetermined amount of time being an amount of time that allows for the sufficient completion of the priming step before beginning the enabling step.

Figure 4C:
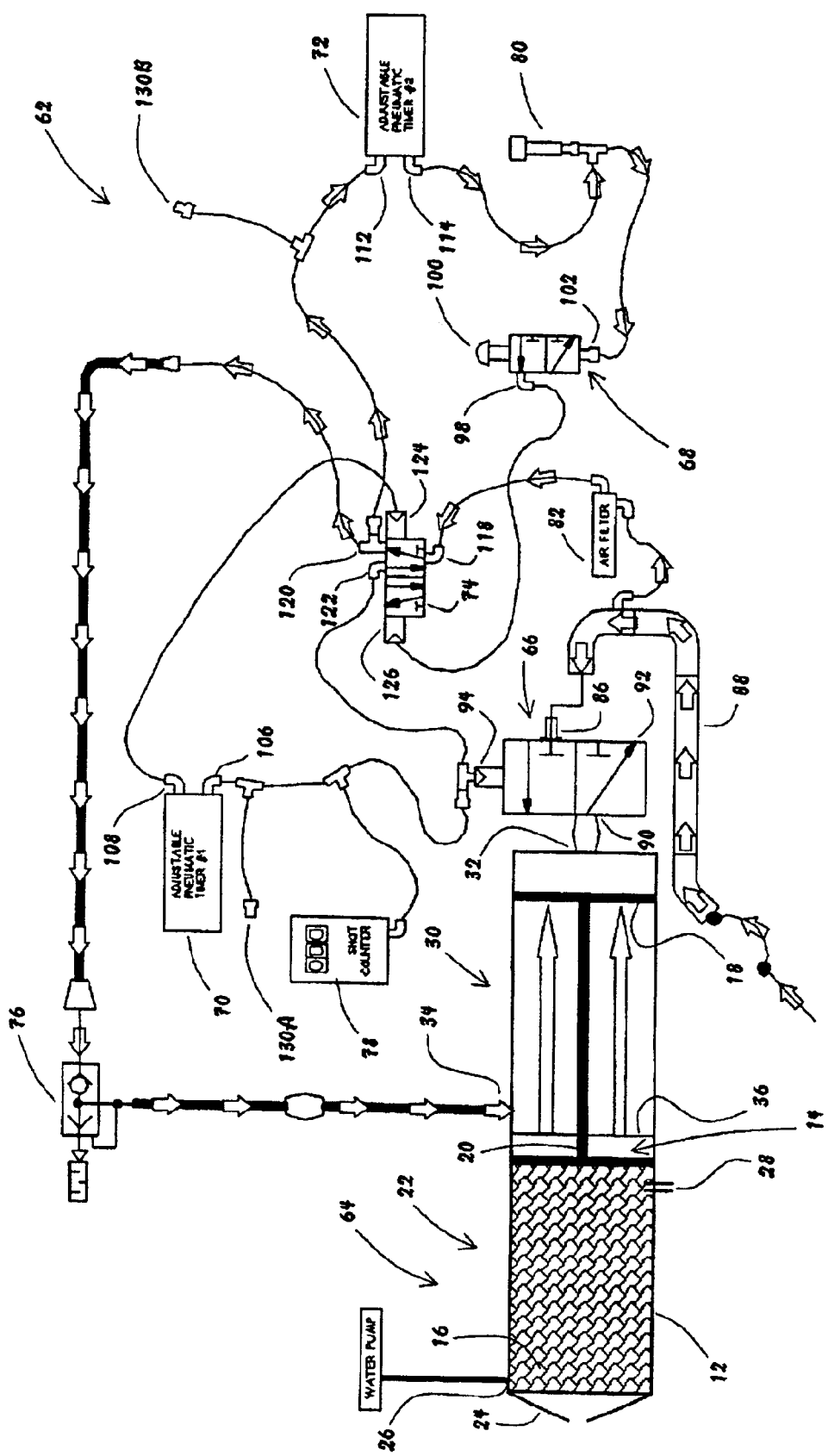

With reference to FIG. 4C, the enabling step (which can be considered to be the end of the priming step) involves the second pneumatic timer providing the disable/enable signal in the enable state at the outlet port 114. The disable/enable signal in the enable state is conveyed to the pressure indicator 80 and the trigger 68. The pressure indicator 80 responds to the disable/enable signal in the enable state by providing the user of the water cannon with an indication that the cannon is primed for firing and the trigger 68 is enabled, i.e., in a safety-off condition. The trigger 68 responds to the disable/enable signal in the enable state by becoming enabled, i.e., capable of generating the "fire" signal upon actuation of the trigger 100.

With reference to FIG. 3, it should be appreciated that the control system 62 is readily modified to operate with a pistonless-type water cannon, such as the cannon shown in FIG. 2. Namely, since there is no piston, the structure between the pneumatic exclusive-or valve 74 and the barrel assembly that is used to move the piston 14 away from the nozzle 24 is eliminated. In addition, the valve 66 is replaced with a valve that need only respond to the firing/priming signal in the "firing" state by allowing pressurized air to be transmitted from an input port that is in communication with the air supply line 88 to an outlet port that is in communication with the gas inlet port of the piston-less water cannon, e.g., the gas inlet port 58 of the barrel assembly 42 in FIG. 2. With the exception of piston related functions, operation of the pneumatic control system for a pistonless-type water cannon is substantially identical to that for the piston-type water cannon.

A number of modifications to the control system 62 are also feasible. For instance, while the operation of the control system 62 has been described with the understanding that there is a substantially continuous flow of water into the barrel of the water cannon, i.e., water is allowed to flow into the barrel regardless of the state of the barrel assembly, there are applications in which it is desirable to only allow water to flow into the barrel during priming operations. For such applications, the flow of water is controlled by a valve that is turned "on" and "off" via pneumatic signals. To elaborate, the valve is turned "on" so that water flows into the barrel using either the first "prime" signal or the "second" prime signal. Consequently, water begins flowing into the barrel at the beginning of the priming period or some predetermined time thereafter. The valve is turned "off" to terminate the flow of water the barrel at a predetermined time after the first "prime" signal or second "prime" signal becomes active and at or before the time that the trigger 68 is enabled. In one embodiment, the disable/enable in the enable state is used to terminate the flow of water to the barrel. In any event, the flow of water to the barrel is terminated sometime during the priming of the barrel assembly.

Another possible modification to the control system 62 is to replace one or both of the first pneumatic timer 70 and second pneumatic timer 72 with a pneumatic sensor/gate device. The pneumatic sensor portion of the device senses the level of the water within the barrel of the water cannon. In the case of a pneumatic sensor/gate that replaces the first pneumatic timer 70, the sensor operates to output a pneumatic signal when the level of water in the barrel is at or below a predetermined point or level, indicating that the firing of the barrel assembly is sufficiently complete for priming to commence. The pneumatic signal is applied to the gate portion. In response, the gate portion outputs the first "prime" signal. Similarly, in the case of a pneumatic sensor/gate device that replaces the second pneumatic timer 72, the sensor operates to output a pneumatic signal when the level of water in the barrel is at or above a predetermined point or level, indicating that priming of the barrel assembly is sufficiently complete and, as such, the trigger 68 can be enabled. The pneumatic signal is applied to the gate portion, which responds to the signal by outputting the disable/enable signal in the enable state. It should be appreciated that a pneumatic sensor/gate device that replaces either the first pneumatic timer 70 or the second pneumatic timer 72 in a pneumatic control system that is used to control a piston-type water cannon can sense the position of the piston rather than sensing the level of water.

Another possible modification to the pneumatic control system 62 is to invert all or some of the logic signals. For example, the firing/priming signal has been described such that when the signal is in the "firing" state the line carrying the signal has a higher pressure than when the signal is in the "priming" state. The pneumatic control system 62 is equally adaptable or capable of utilizing a firing/priming signal in which the "firing" state has a lower pressure than the "priming" state.

A further possible modification involves realizing the functionality of the pneumatic exclusive-or valve 74 with two or more discrete components.

Yet a further modification to the pneumatic control system 62 to employ a gas other than air. Further, the system 62 is capable of being adapted so that a liquid is the transmission medium for all or some of the signals. Consequently, the term pneumatic herein embraces fluid based signals whether in gas form or a liquid form.

What is claimed is:

1. A pneumatic control system for a water cannon that has a barrel for holding a body of water, the barrel having an open end through which a body of water is driven by the application of a fluid-related force and a substantially closed end, the pneumatic control system comprising:

first pneumatic control means for producing a pneumatic safety-on signal after a body of water has been expelled from the open end of the water cannon to place a pneumatic trigger in a disabled state and producing a pneumatic safety-off signal after a sufficient amount of water has been loaded into the barrel of the cannon to place a pneumatic trigger in an enabled state; and second pneumatic control means, responsive to a pneumatic fire signal from the pneumatic trigger, for producing a pneumatic firing signal for causing a valve to allow a fluid related force to be applied to the sufficient amount of water in the barrel of the water cannon.

2. A pneumatic control system, as claimed in claim 1, further comprising:

a pneumatic trigger for receiving said safety-on signal and said safety-off signal and producing said pneumatic fire signal; and a valve for receiving said pneumatic firing signal.

3. A pneumatic control system, as claimed in claim 1, wherein:

said first pneumatic control means includes a pneumatic timer.

4. A pneumatic control system, as claimed in claim 1, wherein:

said first pneumatic control means includes a first pneumatic timer and a second pneumatic timer.

5. A pneumatic control system, as claimed in claim 1, wherein:

said first pneumatic control means includes a pneumatic sensor and a pneumatic gate that is responsive to a signal output by said pneumatic sensor.

\* \* \* \* \*

UNITED STATES PATENT AND TRADEMARK OFFICE
CERTIFICATE OF CORRECTION

PATENT NO. : 6,824,076 B2
DATED : November 30, 2004
INVENTOR(S) : Lloyd E. Harris It is certified that error appears in the above-identified patent and that said Letters Patent is hereby corrected as shown below:

Column 6,
Line 61, delete ""safetyon" condition in", and insert -- "safety-on" condition. In --.

Signed and Sealed this

Twenty-ninth Day of March, 2005

JON W. DUDAS
*Director of the United States Patent and Trademark Office*